United States Patent
Popper et al.

(10) Patent No.: US 10,450,033 B2
(45) Date of Patent: Oct. 22, 2019

(54) AUTOMATIC TRANSMISSION SYSTEM WHERE GEAR ENGAGEMENT IS DETERMINED BY THE ANGULAR VELOCITY OF THE DRIVEN WHEEL

(71) Applicants: POPPER TECHNOLOGIES (1983) LTD., Zichron Yaakov (IL); Ziv Achituv Popper, Zichron Yaakov (IL); Ruhama Popper, Zichron Yaakov (IL)

(72) Inventors: Ziv Achituv Popper, Zichron Yaakov (IL); Boaz Jachin Popper, Zichron Yaakov (IL)

(73) Assignee: POPPER TECHNOLOGIES (1983) LTD., Zichron Yaakov (IL)

( * ) Notice: Subject to any disclaimer, the term of this patent is extended or adjusted under 35 U.S.C. 154(b) by 392 days.

(21) Appl. No.: 15/511,657

(22) PCT Filed: Sep. 10, 2015

(86) PCT No.: PCT/IL2015/050926
§ 371 (c)(1),
(2) Date: Mar. 16, 2017

(87) PCT Pub. No.: WO2016/042548
PCT Pub. Date: Mar. 24, 2016

(65) Prior Publication Data
US 2017/0349237 A1    Dec. 7, 2017

(30) Foreign Application Priority Data
Sep. 17, 2014    (GB) .................................. 1416382.8

(51) Int. Cl.
*F16H 37/02*    (2006.01)
*F16H 61/02*    (2006.01)
(Continued)

(52) U.S. Cl.
CPC ............. *B62M 11/06* (2013.01); *B62M 11/14* (2013.01); *F16H 37/02* (2013.01); *F16H 61/0295* (2013.01); *B62M 6/40* (2013.01)

(58) Field of Classification Search
CPC ...... F16H 37/02; F16H 61/0295; B62M 11/06
(Continued)

(56) References Cited

U.S. PATENT DOCUMENTS 3,513,726 A    5/1970    Segawa et al.
5,318,486 A    6/1994    Lutz
(Continued)

FOREIGN PATENT DOCUMENTS

WO    2008/147236 A1    4/2008
WO    2016/042548 A1    3/2016

OTHER PUBLICATIONS

UK Patent Application No. GB1416382.8, dated Sep. 17, 2014.
(Continued)

*Primary Examiner* — Ha Dinh Ho

(57) ABSTRACT

An automatic transmission system [100] for controlling application of a power source [160] onto a driven-wheel [110] comprises at least two gear-sets [200] mounted on at least one mediating-disk [120], where the mediating-disks [120] are mounted on a dead-axle shaft [210]. The gear-sets [200] has (a) an output-wheel [130] connected to the power source [160] and revolves accordantly; diameter of the output-wheel [130] configured to set transmission-ratio of angular-velocity and torque to be applied to the driven-wheel [110]; the output-wheel [130] is mounted on the dead-axle shaft [210] and set side by side with the mediating-disk [120]; and (b) an Angular-Velocity Engagement Module [205] configured for automatic engagement and disengagement of the output-wheel [130] with the driven-wheel [110]. Each of the output wheels [130] has different
(Continued)

diameter, configured for different transmission-ratio of angular-velocity and torque to be applied to the driven-wheel [110].

20 Claims, 4 Drawing Sheets

(51) Int. Cl.
*B62M 11/06* (2006.01)
*B62M 11/14* (2006.01)
*B62M 6/40* (2010.01)

(58) Field of Classification Search
USPC .......................................................... 74/335
See application file for complete search history.

(56) References Cited

U.S. PATENT DOCUMENTS

| | | |
|---|---|---|
| 5,976,052 A | 11/1999 | Lenoble |
| 6,048,287 A | 4/2000 | Rohloff |
| 6,258,005 B1 * | 7/2001 | Rohloff ................. B62M 11/18 475/277 |
| 6,852,060 B1 * | 2/2005 | Ash ..................... B62M 11/145 280/259 |
| 7,370,873 B2 * | 5/2008 | Hong ...................... B62M 1/24 280/253 |
| 7,445,223 B2 * | 11/2008 | Hong ...................... B62M 1/36 280/253 |
| 7,803,090 B2 * | 9/2010 | Kraus .................... A63B 22/00 280/224 |
| 8,535,206 B2 * | 9/2013 | Kraus ................... A63B 22/001 280/210 |
| 2014/0035347 A1 | 2/2014 | Zanfei et al. |

OTHER PUBLICATIONS

International Search Report for PCT/12015/050926, dated Jan. 6, 2016.

Written Opinion of the International Search Authority for PCT/IL2015/050926, dated Jan. 6, 2016.

* cited by examiner

AUTOMATIC TRANSMISSION SYSTEM WHERE GEAR ENGAGEMENT IS DETERMINED BY THE ANGULAR VELOCITY OF THE DRIVEN WHEEL

CROSS-REFERENCE TO RELATED APPLICATIONS

This application is a U.S. National Phase filing under 35 U.S.C. 371 of International (PCT) Patent Application No. PCT/IL2015/050926, filed 10 Sep. 2015, which claims priority from UK Patent Application No. GB1416382.8, filed 17 Sep. 2014, both of which are incorporated by reference in their entirety.

BACKGROUND OF THE INVENTION

Ever since the invention of bicycles, there was a search for an easier and more comfortable propelling system, a system that will improve bicycles usability hence make them useful for a wider range of people as a daily transportation mean.

The common trend towards green transportation also encourages the use of man powered vehicles.

The first bicycles were merely supporting a running person's weight. Cranked propelling pedals, driving the front wheel were later added. A chain drive with the crank pedals driving the rear wheel followed. Manual gears were added for easier riding over hills. Those gears diverted from internal planetary gears assembled within the rear wheel hub to the external, more popular, chain gears. Motorizing bicycles formed a different branch spanning from motor-cycles of all kinds to the electrically powered bicycles.

Gear shifting devices added, while widening the dynamic range of the engine, motor, and human propelled bicycles, require higher technical understanding to operate and take full use of their advantages.

The average potential rider does not have the skills or will to operate manual shifters and is usually baffled by the plurality of the gear ratios on one hand. On the other hand wants the convenience of automatic transmission which conceals the hassles and whistles of the underline mechanics.

With Motor-scooters the tendency is to implement a belt variators electronically controlled as the preferred transmission method. In man powered vehicles, we look for a better energy efficient mechanisms. Hence, variators, slip clutches, robotic clutches, or even computerized actuators utilized to operate common chain gear derailleur's, are a patched improvement to a non satisfactory solution.

Therefore, there is a long felt need for a drive that would eliminate the confusion of deciding, which is the suitable ratio required for a specific terrain, and provide a smooth, comfortable and easy ride.

Shimano, U.S. Pat. No. 3,513,726, discloses an automatic three-stage speed change bicycle hub, which comprises a driving sleeve having a usual driving sprocket wheel, a planetary gear mechanism provided between said driving sleeve and the hub shell, a high speed-ratio transmission ratchet gearing, both ratchet gearing being associated with said planetary gear mechanism, and centrifugal governor weights adapted to effect operative engagement and disengagement of said high speed-ratio transmission ratchet gearing according to speed of rotation of the driving sprocket wheel.

Lenoble, U.S. Pat. No. 5,976,052, discloses a compact automatic gear change device for a bicycle in which all of the sprocket wheels mesh by means of an intermediate moving element and are equipped with anti-reverse pawls automatically controlled by mechanical or electronic tachometers. The first disclosed device is a line gear cluster incorporated in a sealed housing and connecting the bottom bracket spindle to the wheel spindle by completely eliminating the drive chain. The second disclosed device is composed of coaxial sprocket wheels driven by three intermediate moving elements positioned on the inside, whereas the starting teeth of the wheels, the pawls and the tachometers are positioned on the outside. The assembly disclosed is housed in two sealed housings that rotate over one another.

The speed-ratio transmission of the gear sets as disclosed in the prior art is depend upon the angular velocity of the driving wheel, however these systems do not consider requirements or inputs of the driven wheel such as the rotated load or actual the angular velocity of the driven wheel.

Hadeev, WO/2008/147236, discloses a mechanisms which modifies the transmission ratio when the shaft load is modified. A mechanism which can be, for example, in the form of a tool reducing gear, in particular a screwdriver, a car clutch gear and a helicopter or gyrocopter propeller reducing gear. Hadeev transmission ratio converter designed in the form of a device comprising a planetary differential gear with a carrier and different-diameter toothed wheels, one of which is rigidly secured to an output shaft for transmitting the engine energy thereto, and the second toothed wheel is put onto the drive part of a friction device with a determined sliding force which produces a braking torque and an adjusting transmission ratio, the driven part of the friction device being rigidly connected to the third central toothed wheel which is freely rotatable on the output shaft and transmits rotation, via a reduction gear, to a fourth toothed wheel which is rigidly connected to the output shaft.

However, there is still a long felt need for a simple drive that can be applied for man powered devices such as bicycles. A drive that would determine the application of the power source onto the driven-wheel depended upon the angular velocity of the driven wheel which is carrying the rotated load. The device should be enclosed to conceal the underlining mechanism, maintenance free, and preferably an "add-on" to the existing fleet of bicycles.

SUMMARY OF THE INVENTION

It is one object of the present invention to provide an automatic transmission engagement system for controlling application of a power source onto a driven-wheel, the system comprising at least two gear sets, each gear-set mounted on at least one mediating-disk rotatably connected to a dead-axle shaft with one or two gear-sets per mediating disk; each of the gear-sets having:
  a. an output-wheel connected to the power source and revolves accordantly; diameter of the output-wheel configured to set transmission-ratio of angular-velocity and torque applied to the driven-wheel; the output-wheel is mounted on the dead-axle shaft and set side by side with the mediating-disk;
  b. an Angular-Velocity Engagement Module (AVEM) configured for automatic engagement and disengagement of the output-wheel with the driven-wheel;
  the output wheels each having a different diameter, configured for different transmission-ratio of the angular-velocity and the torque applied in to the driven-wheel;

wherein the at least one mediating-disk is mounted inside the driven-wheel, where outer perimeter of the at least one mediating-disk in partial contact with inner perimeter of the driven-wheel, thus the mediating-disk is coupled with and revolved by the driven-wheel;

each of the AVEM is configured for the engagement and the disengagement in correlation with the angular-velocity of the mediating disk hence the driven wheel according to a predefined required transmission ratio of the angular-velocity and the torque for the driven-wheel; such that the controlling of the application of the power source depends solely upon angular-velocity of the driven-wheel.

It is another object of the present invention to provide the system as defined above, wherein the AVEM comprising:
  a. a ratchet-gear with at least one tooth; the ratchet-gear is firmly attached to the output-wheel and revolves accordantly;
  b. at least one engagement-set, comprising: a pawl and a weight; the pawl configured to mate with the ratchet's tooth; the engagement-set is pivotally attached by a pivot holder on the mediating-disk and revolves accordantly;
  c. at least one buckling-spring, fixed between the mediating-disk and the weight;

the buckling-spring configured to prevent mating of the pawl with the ratchet's tooth, until centrifuge force of the weight's, caused by the angular-velocity of the mediating-disk, yields the buckling-spring, pivots the engagement-set and enables the mating of the pawl with the ratchet's tooth, such that power of the power source is transformed via the output-wheel and the mediating disk to the driven-wheel;

load of the weight and spring-constant K of its matching buckling-springs are correlated with angular-velocity of the mediating-disk's required for the engagement of the output-wheel with the driven-wheel via the mediating-disk;

when angular-velocity of the driven wheel is higher than of the gear set, the mediating-disk revolves faster than the output-wheel, consequently the pawl separates from the ratchet's tooth and slides on back of the ratchet's tooth, such that the output-wheel is disengaged from the mediating-disk and the driven-wheel;

alternatively, when angular-velocity of the driven wheel decreases, the weight no longer exert enough centrifuge force to overcome the buckling spring, such that the buckling spring pushes out and separates the pawl from mating the ratchet tooth.

It is another object of the present invention to provide the system as defined above, wherein the weight, of the gear-set having the output-wheel with largest diameter, is lighter than its associated the pawl, and the spring configured to keep the pawl mated with the ratchet's tooth, as a default option until angular-velocity of the driven wheel is higher than of the gear set, the mediating-disk revolves faster than the output-wheel, consequently the pawl separates from the ratchet's tooth and slides on back of the ratchet's tooth, such that the output-wheel is disengaged from the mediating-disk and the driven-wheel.

It is another object of the present invention to provide the system as defined above, wherein the buckling spring is characterized by a relatively high constant K, however it yields with a relatively small deflection. Hence for every practical consideration applies a constant force, until it yields, then the spring behaviour turns to a bending-leaf spring with a relatively low spring constant $K_2$; such that the engagement between the pawls and the ratchet teeth is abrupt; consequently the engagement occurs at higher angular-velocity than angular-velocity of the disengagement; engagement and the disengagement are configured with hysteresis therebetween.

It is another object of the present invention to provide the system as defined above, wherein the AVEM comprises two of the engagement sets; the AVEM further comprises two connecting rods, where each of the connecting rods is connected to on first end to the pawl and on second end to the following weight; the connecting rods configured to balance and synchronize the engagement and the disengagement of the two pawls with the ratchet teeth.

It is another object of the present invention to provide the system as defined above, wherein the spring is a mechanism where the behavior of the mechanism answers the threshold and hysteresis requirements.

It is another object of the present invention to provide the system as defined above, wherein the output-wheel is a sprocket-wheel configured to be attached to a revolving chain.

It is another object of the present invention to provide the system as defined above, wherein the output-wheel is a belt-wheel configured to be attached to a revolving belt.

It is another object of the present invention to provide the system as defined above, wherein the output-wheel is a cogged-wheel configured to be attached to a revolving timing-belt.

It is another object of the present invention to provide the system as defined above, wherein the two gear sets are mounted along both sides of a single the mediating-disk and on its' the dead-axle shaft.

It is another object of the present invention to provide the system as defined above, wherein the outer perimeter of the mediating-disk comprises sprocket-teeth and the inner perimeter of the driven-wheel comprises notches configured to mate with the mediating-disk's sprocket-teeth, such that the mediating-disk is revolved by the driven-wheel.

It is another object of the present invention to provide the system as defined above, wherein the mediating-disk and the driven-wheel are configured as a planetary gear and an internal gear, respectively, further comprising a sun gear; thereby the mediating-disk is revolved by the driven wheel.

It is another object of the present invention to provide the system as defined above, wherein the system is configured to be integrated into a vehicle selected from the group consisting of: bicycles, tricycles, four-wheeled manpowered vehicles, pedal-boats, pedal driven manpowered light aircrafts or motorized vehicles.

It is another object of the present invention to provide the system as defined above, wherein the pawls comprise an elastomeric pad configured for softening of the engagement, for reducing the wear of the pawls and the ratchet teeth and for balancing power transmission among the plurality of ratchet teeth.

It is another object of the present invention to provide the system as defined above, wherein the dead-axel shaft is replaced with a rotary shaft; the rotary shaft is fixed to the mediating-disk and revolves accordingly.

It is another object of the present invention to provide the system as defined above, wherein the system is configured without the driven wheel and wherein an output load is connected to the rotary shaft, thereby revolved by the rotary shaft; the output load is selected from a group consisting of: a wheel, a pedal wheel of a pedal boat, a home generator or any application where a human serves as the driving force and a gear is required.

It is another object of the present invention to provide the system as defined above, wherein the power source is selected from a group consisting of: revolving crank and revolving engine.

It is another object of the present invention to provide the system as defined above, further comprising a mediator-wheel, sited on the dead-axle shaft and connected to the driven-wheel thereby spinning with same angular velocity; the mediator-wheel configured to accommodate the at least one mediating-disk such that the outer perimeter of the at least one mediating-disk is in partial contact with inner perimeter of the mediating-wheel instead of the inner perimeter of the driven-wheel.

It is another object of the present invention to provide the system as defined above, wherein the mediator-wheel is connected to the driven-wheel by plurality of spokes.

BRIEF DESCRIPTION OF THE DRAWINGS

In order to understand the invention and to see how it may be implemented in practice, a plurality of embodiments will now be described, by way of non-limiting example only, with reference to the accompanying drawings, in which.

DETAILED DESCRIPTION OF PREFERRED EMBODIMENTS

Figure 1:
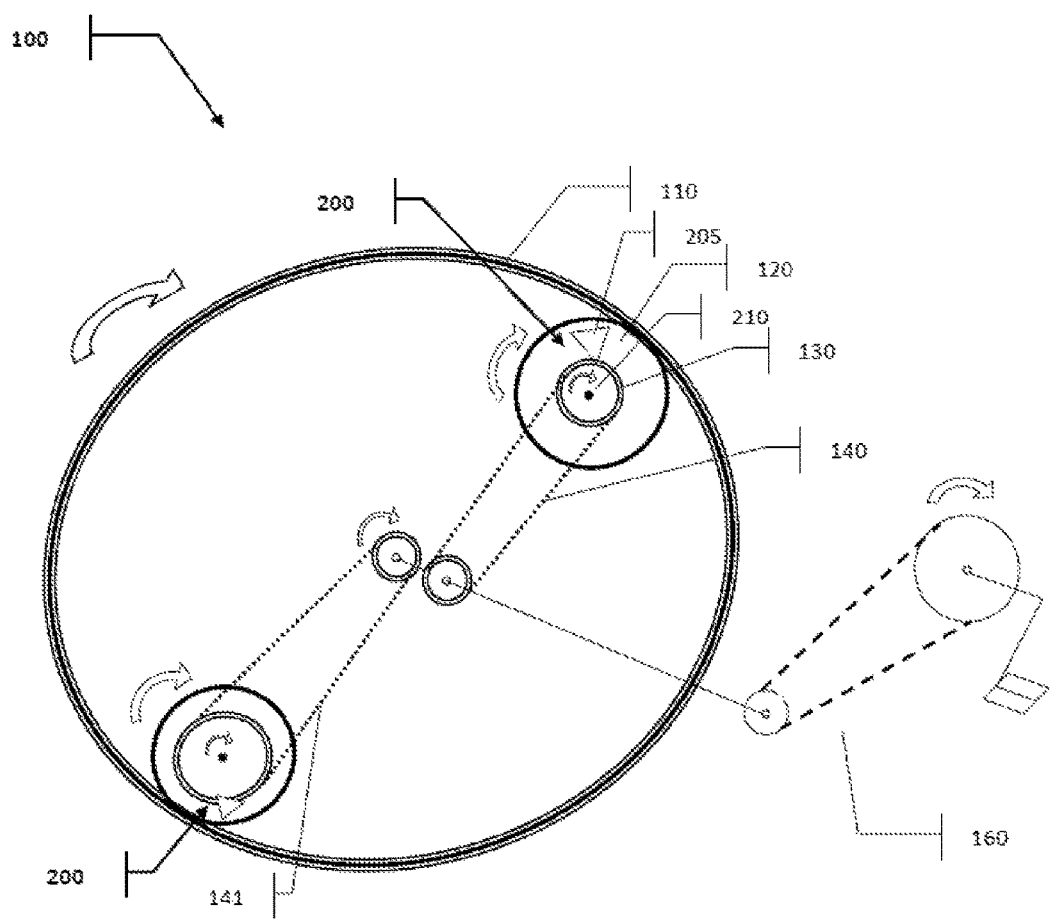
FIG. 1: discloses a general view of the automatic transmission system for controlling the application of a power source onto a driven-wheel.

The present invention provides an echo-friendly, automatic and easy to use drive, which is a transmission of power to machinery, configured for bicycles, tricycles, four-wheeled man-powered light vehicles, pedal boats and can also be integrated on pedal driven manpowered light aircrafts. The drive can also easily be incorporated into motorized vehicles, however in such case some adaptations are required as usually both systems occupies the same hub, fully utilize the invention.

The present invention provides an automatic engagement system for controlling the application of a power source onto a driven-wheel [110]. The system [100] comprising at least two gear-sets [200]. Each gear-set [200] is mounted on at least one mediating-disk [120] rotatably connected to a dead-axle shaft [210]. The aforesaid mediating-disk [120] is mounted on a dead-axle shaft [210], with the one or two gear-sets [200], where each is mounted on a different side. Each of the gear sets [200] having:
  a. an output-wheel [130] mechanically coupled with a revolving power source [160] and revolves accordantly; where diameter of the output-wheel [130] is configured to set the transmission-ratio for the angular-velocity and torque applied to the driven-wheel [110]; the output-wheel [130] is mounted on the dead-axle shaft [210] and set side by side with the mediating-disk [120];
  b. an Angular-Velocity Engagement Module (AVEM) [205] configured for automatic engagement and disengagement of the output-wheel [130] with the driven-wheel [110];

In case of more than one output wheel [130] each is having different diameter, configured for different transmission-ratio of the angular-velocity and the torque applied in to the driven-wheel [110];

The at least one mediating-disk [120] is mounted inside the driven-wheel [110], where the outer perimeter [121] of the at least one mediating-disk [120] is in partial contact with inner perimeter [111] of the driven-wheel [110], such that the mediating-disk [120] is coupled with and revolved by the driven-wheel [110]. The ratio of the coupling depicts the final transmission ratio. When there is more than one mediating disks all are revolving in synch. One drives the driven wheel and the others are driven by it.

Each of the AVEMs [205] is configured for engagement and disengagement in correlation with the angular-velocity of the mediating disk [120]. The engagement depends solely on a predefined angular velocity of the driven wheel. Each of the AVEMs is associated to the application of different transmission ratio of the angular velocity and the torque to the driven wheel.

According to a preferred embodiment where the AVEM [205] comprising:
  a. a ratchet-gear [230] with at least one tooth [235]; where the ratchet-gear [230] is firmly attached to the output-wheel [130] and revolves accordantly;
  b. at least one engagement-set [270], comprising: a pawl [275] and a weight [276]; the pawl [275] is configured to mate with the ratchet's tooth [235]; the engagement-set [270] is pivotally attached by a pivot holder [280] to the mediating-disk [120] and revolves accordantly;
  c. at least one buckling-spring [260], fixed between the mediating-disk [120] and the weight [276].

The buckling-spring [260] is configured to prevent mating of the pawl [275] with the ratchet's tooth [235], until centrifuge force of the weight's [276], caused by the angular-velocity of the mediating-disk [120], yields the buckling-spring [260], pivots the engagement-set [270] and enables the mating of the pawl [275] with the ratchet's tooth [235], such that power of the power source [160] is transformed via the output-wheel [130] and the mediating disk [120] to the driven-wheel [110].

Buckling spring behaves like a constant force spring: Due to relatively high spring constant K and the fact that after a small deflection the spring buckles (yields) and changes its behavior to that of a compression spring, which presents a much lower spring coefficient.

The load of the weight [276] and the almost constant force F of its matching buckling-springs [260] are correlated with angular-velocity of the driven wheel's required for the engagement of the output-wheel [130] with the driven-wheel via the mediating-disk [120].

When the angular-velocity of the driven wheel [120] is higher than of the angular velocity of the gear set [200], the mediating-disk [120] revolves faster than the output-wheel [130], consequently the pawl [275] separates from the ratchet's tooth [235] and slides on the rounded back [236] of the ratchet's tooth [235], such that the output-wheel [130] is disengaged off the mediating-disk [120] and from the driven-wheel [110].

Alternatively, when angular-velocity of the driven wheel [120] decreases, the weight [246] no longer exert enough centrifuge force to overcome the buckling spring [260] (now behaving like a compression spring), such that the buckling spring [260] pushes out and separates the pawl [275] from mating the ratchet tooth [235]. This happens at a lower angular velocity of the driven wheel hence hysteresis is achieved.

According to another embodiment, one engagement sets have a zero weight [335] of the engagement-set [270] of the output-wheel [131] which have largest diameter, is lighter than the pawl [330], and a compression spring [320] configured to keep the pawl [330] mated with the ratchet's tooth [235], as a default option. When a higher velocity ratio AVEM engages the angular-velocity of the driven wheel [120] is higher than of the gear-set [200], and the mediating-disk [120] revolves faster than the output-wheel [130], consequently the pawl [275] separates from the ratchet's tooth [235] and slides on back [236] of the ratchet's tooth [235], such that the output-wheel [130] is temporarily disengaged from the mediating-disk [120] and the driven-wheel [110].

According to another embodiment, the spring constant K of the buckling spring [260] is relatively high; hence movement of the spring [260] for every practical consideration applies a constant force, until it yields, then the spring [260] is configured to turn to a bending-leaf spring with a relatively low spring constant $K_2$; such that the engagement between the pawls [275] and the ratchet teeth [235] is abrupt; consequently the engagement occurs at higher angular-velocity than angular-velocity of the disengagement; engagement and the disengagement are configured with hysteresis therebetween.

According to another embodiment, the spring [320] is a mechanism configured for predetermined threshold and hysteresis requirements According to another embodiment, the AVEM [205] comprises two or more engagement sets [270] and further two connecting rods [510]. Each of the connecting rods [510] is connected to on first end to the pawl [275] and on second end to the following weight [276]. The connecting rods [510] are placed to balance and synchronize the engagement and the disengagement of the two or more pawls [275] with the ratchet teeth [235].

According to another embodiment the spring [320] is a compression spring. According to another embodiment the output-wheel [130] is a sprocket-wheel configured to be attached to a revolving chain [140].

According to another embodiment the output-wheel [130] is a belt-wheel configured to be attached to a revolving belt [141]. According to another embodiment the output-wheel [130] is a cogged-wheel configured to be attached to a revolving timing-belt.

According to another embodiment the output-wheel [130] is a spur gear wheel configured to be coupled with another spur directly driven by the power source.

According to another embodiment the outer perimeter [121] of the mediating-disk [120] comprises sprocket-teeth [122] and the inner perimeter [111] of the driven-wheel comprises notches [112] configured to mate with the mediating-disk's sprocket-teeth [111], such that the mediating-disk [120] is revolved by the driven-wheel [110].

According to another embodiment the mediating-disk [120] and the driven-wheel are configured as a planetary gear and an internal gear, respectively, further comprising a sun gear; thereby the mediating-disk [120] is revolved by the driven wheel [110].

According to another embodiment the system is configured to be integrated into a vehicle selected from the group consisting of: bicycles, tricycles, four-wheeled manpowered vehicles, pedal-boats, pedal driven manpowered light aircrafts or motorized vehicles.

According to another embodiment the pawls [275,330] comprise an elastomeric pad [277] configured for softening of the engagement, for reducing the wear of the pawls [275,330] and the ratchet teeth [235] and for balancing power transmission among the plurality of ratchet teeth [235].

According to another embodiment the dead-axel shaft [210] is replaced with a rotary shaft; the rotary shaft is fixed to the mediating-disk [120] and revolves accordingly.

According to another embodiment the system is configured without the driven wheel and wherein an output load is coupled to the rotary shaft, thereby revolved by the rotary shaft; the output load is selected from a group consisting of: a wheel, a pedal wheel of a pedal boat, a home generator or any application where a human serves as the driving force and a gear is required.

According to another embodiment the power source [160] is selected from: revolving crank and revolving engine.

According to a preferred embodiment the system [100] further comprising a mediator-wheel [115], sited on the dead-axle shaft [210] and connected to the driven-wheel thereby spinning with same angular velocity; the mediator-wheel [115] configured to accommodate the at least one mediating-disk [120] such that the outer perimeter [121] of the at least one mediating-disk [120] is in partial contact with inner perimeter of the mediating-wheel [115] instead of the inner perimeter [111] of the driven-wheel [110].

The mediator wheel [115] together with rotating side walls construct a closed hub in which the whole transmission resides.

According to another embodiment the mediator-wheel [115] is connected to the driven-wheel by plurality of spokes [163].

Reference is now made to FIG. 1, demonstrating the automatic transmission system [100] for controlling application of angular velocity and torque onto driven-wheel [110]. As shown two mediating-disks [120], are mounted on dead-axle shafts [210], with one gear-set [200] for each. the power source [160] demonstrated in FIG. 1 is a bicycle paddling crank.

Figure 2:
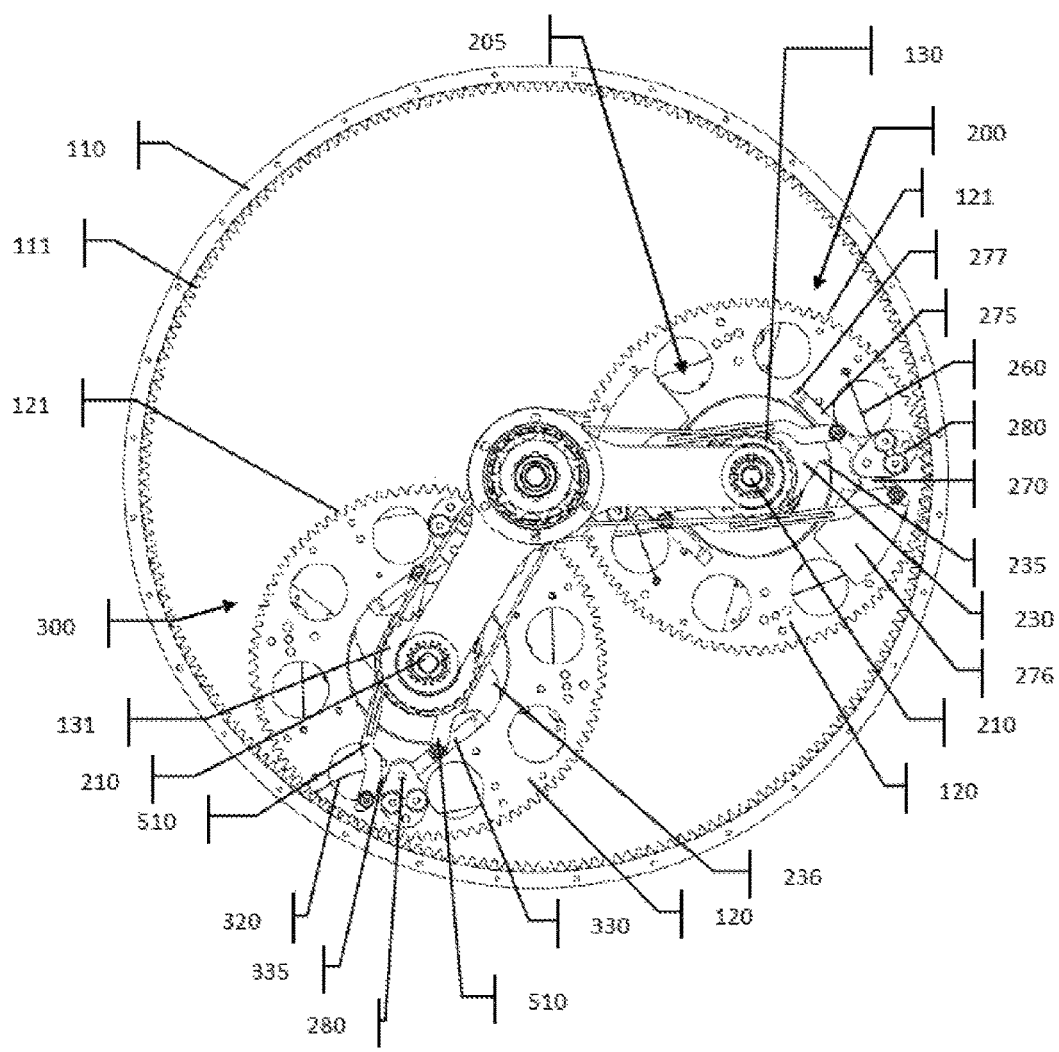
FIG. 2: discloses a detailed view of the automatic transmission system.
Figure 3:
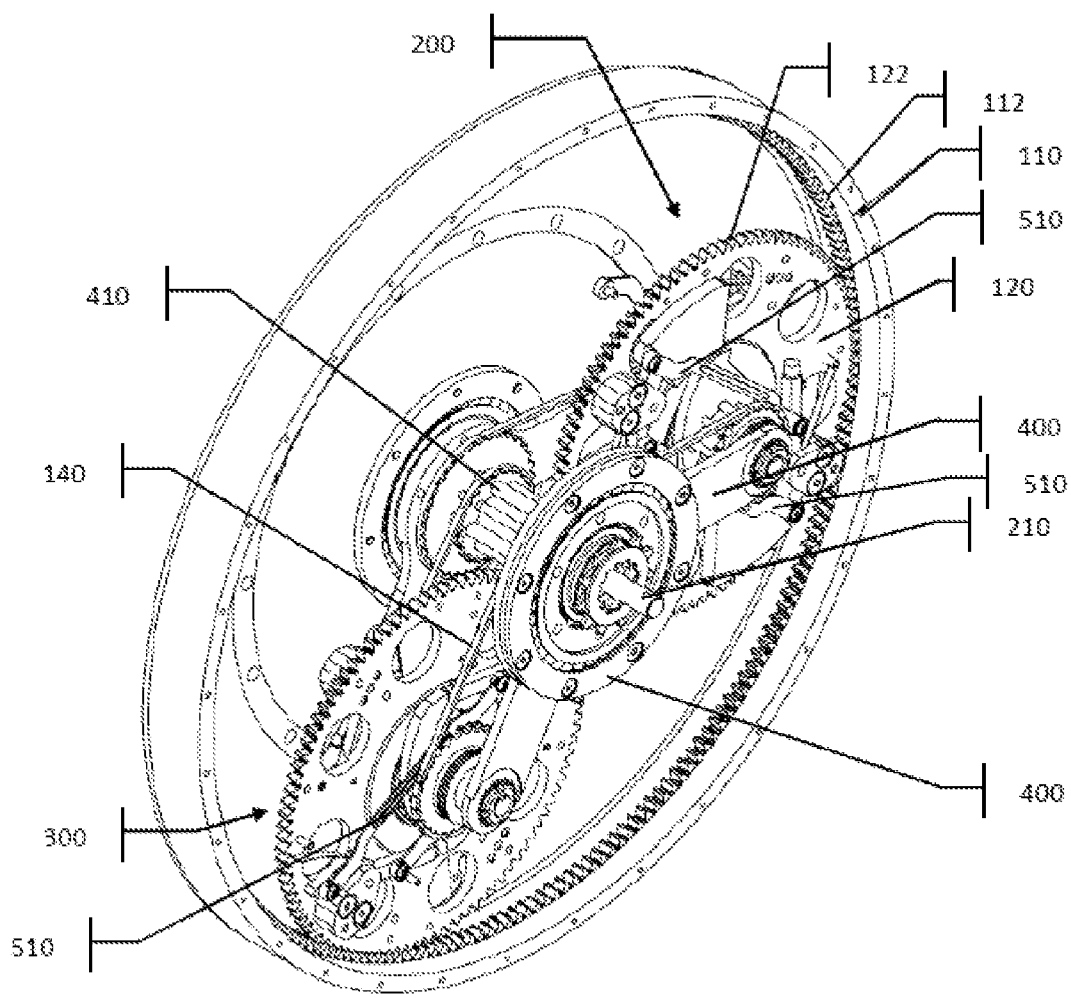
FIG. 3: discloses a detailed perspective view of the automatic transmission system.

FIG. 1 further demonstrates the gear-sets [200] having:
a. an output-wheel [130] connected to the power source [160] and revolves accordingly; the output-wheel [130] is mounted on the dead-axle shaft [210] and set side by side with the mediating-disk [120];
b. an Angular-Velocity Engagement Module (AVEM) [205] configured for automatic engagement and disengagement of the output-wheel [130] with the driven-wheel [110];

As shown, the mediating-disk [120] is mounted inside the driven-wheel [110], where outer perimeter [121] of the mediating-disk [120] is in partial contact with inner perimeter [111] of said driven-wheel [110], thus the mediating-disk [120] is coupled with and revolved by the driven-wheel [110];

Reference is now made to FIGS. 2 and 3 disclosing a preferred embodiment where the AVEM [205] comprising:
a. a ratchet-gear [230] with two teeth [235] (one is hidden); where the ratchet-gear [230] is firmly attached to the output-wheel [130] and revolves accordingly;
b. two engagement-set [270], each comprising: a pawl [275] and a weight [276]; the pawls [275] are configured each to mate with the ratchet's tooth [235]; the engagement-set [270] pivotally attached by a pivot holder [280] to the mediating-disk [120] and revolves accordingly;
c. at least one buckling-spring [260], fixed between the mediating-disk [120] and the weight [276].

The buckling-spring [260] as in this example is configured to prevent mating of the pawl [275] with the ratchet's tooth [235], until centrifuge force of the weight's [276], caused by the angular-velocity of the mediating-disk [120], yields the buckling-spring [260], pivots the engagement-set [270] and enables the mating of the pawl [275] with the ratchet's tooth [235], such that power of the power source [160] is transformed via the output-wheel [130] and the mediating disk [120] to the driven-wheel [110].

The load of the weight [276] and the-constant force F of its matching buckling-springs [260] are correlated with angular-velocity of the mediating-disk's [120] required for the engagement of the output-wheel [130] with the driven-wheel via the mediating-disk [120].

When the angular-velocity of the driven wheel [120] is higher than of the angular velocity of the gear set [200], the mediating-disk [120] revolves faster than the output-wheel [130], consequently the pawl [275] separates from the ratchet's tooth [235] and slides on the rounded back [236] of the ratchet's tooth [235], such that the output-wheel [130] is disengaged from the mediating-disk [120] and from the driven-wheel [110].

Alternatively, when angular-velocity of the driven wheel [120] decreases, the weight [246] no longer exert enough centrifuge force to overcome the now leaf spring [260], such that the leaf spring [260] pushes out and separates the pawl [275] from mating the ratchet tooth [235].

According to another embodiment, the weight [335] of the engagement-set [271] of the output-wheel [131] having largest diameter, is lighter than the pawl [330], and the spring [320] configured to keep the pawl [330] mated with the ratchet's tooth [235], as a default option, until a higher velocity ration AVEM engages and the angular-velocity of the driven wheel [120] is higher than of the gear-set [200], when the mediating-disk [120] revolves faster than the output-wheel [130], consequently the pawl [275] separates from the ratchet's tooth [235] and slides on back [236] of the ratchet's tooth [235], such that the output-wheel [130] is temporarily disengaged from the mediating-disk [120] and the driven-wheel [110].

FIGS. 2 and 3 further disclose a detailed example for some of the present invention's embodiments including two carrying constructions [400] sited on both sides the driven-wheel hub, with motion conveyers [410] configured to correlate therebetween. The carrying construction [400] is configured to carry the at least one mediating-disks [120], in this example two mediating disks [120]. FIGS. 2a and 3 further demonstrate two gear-sets [200,300] where the left gear-set [300] encompass the largest output-wheel [131], and therefore demonstrates the spring [320] configured to keep the pawl [330] mated with the ratchet's tooth [235], as a default option, until angular-velocity of the driven wheel [120] is higher than of the gear-set [200].

Figure 4:
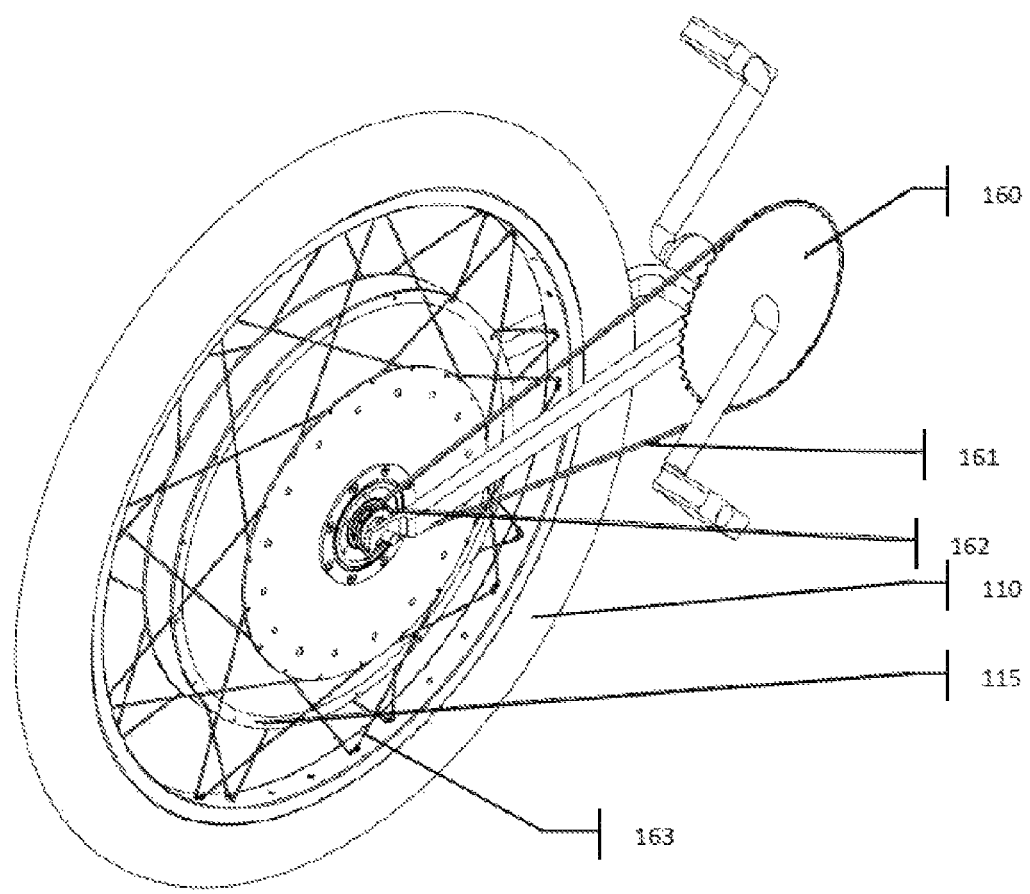
FIG. 4: discloses a general view of an embodiment of the automatic transmission.

Reference is now made to FIG. 4 disclosing another embodiment where the system [100] further encompasses a mediator-wheel [115], sited on the dead-axle shaft [210] and connected to the driven-wheel thereby spinning with same angular velocity. The mediator-wheel [115] configured to accommodate the at least one mediating-disk [120] such that the outer perimeter [121] of the at least one mediating-disk [120] is in partial contact with inner perimeter of the mediating-wheel [115] instead of the inner perimeter [111] of the driven-wheel [110]. According to another embodiment the mediator-wheel [115] is connected to the driven-wheel by plurality of spokes [163]. Another embodiment disclosed by FIG. 4 is the closed hub which encapsulates the whole transmission.

Reference is now made to FIG. 5, disclosing the engaging and disengaging methods for the automatic transmission. In the beginning [610], the output-wheel with the $1^{st}$ largest diameter is engaged as a default option. In the following step [620], as the driven-wheel is rotating faster, the centrifuge force activated upon the weights engages the flowing ($2^{nd}$) largest output-wheel, by means of mating the pawls with the ratchet gear's teeth. The pawls of the largest output-wheel are then sliding on the rounded back of the ratchet-gear teeth. In the following steps [630] the driven wheel may even rotate faster such that the centrifuge force engages the $N^{th}$ largest output-wheel with the driven wheel and disengages the $(N-1)^{th}$ output-wheel. Once the driven-wheel is slowing down [640], the weakening of the centrifuge force disengages the $N^{th}$ largest output-wheel, and engages the $(N-1)^{th}$ output-wheel. Eventually at the last step [650], once the driven-wheel is slow enough, the weakening of the centrifuge force disengages the $2^{nd}$ largest output-wheel, and default option is engaged.

It will be appreciated by a person skilled in the art that the present invention is not limited by what has been particularly shown and described hereinabove. Rather the scope of the present invention includes both combinations and sub-combinations of the features described hereinabove as well as modifications and variations thereof which would occur to a person of skill in the art upon reading the foregoing description and which are not in the prior art.

The invention claimed is:

1. An automatic transmission engagement system [100] for controlling application of a power source [160] onto a driven-wheel [110], said system comprising at least two gear-sets [200]; each gear-set mounted on at least one mediating-disk [120] rotatably connected to a dead-axle shaft [210]; each of said gear-sets [200] having:
    a. an output-wheel [130] connected to said power source [160] and revolves accordingly; diameter of said output-wheel [130] configured to set transmission-ratio of angular-velocity and torque applied to said driven-wheel [110]; said output-wheel [130] is mounted on said dead-axle shaft [210] and set side by side with said mediating-disk [120];
    b. an Angular-Velocity Engagement Module (AVEM) [205] configured for automatic engagement and disengagement of said output-wheel [130] with said driven-wheel [110];
        each of said output wheel [130] having different diameter, configured for different said transmission-ratio of said angular-velocity and said torque to be applied to said driven-wheel [110];
    wherein said at least one mediating-disk [120] is mounted inside said driven-wheel [110], where outer perimeter [121] of said at least one mediating-disk [120] in partial contact with inner perimeter [111] of said driven-wheel [110], thus said mediating-disk [120] is coupled with and revolved by said driven-wheel [110];
    each of said AVEM [205] is configured for said engagement and said disengagement in correlation with said angular-velocity of said mediating disk [120] according to a predefined required transmission ratio of said angular-velocity and said torque for said driven-wheel [110]; such that said controlling of the application of said power source [160] depends solely upon angular-velocity of said driven-wheel [110].

2. The system [100] according to claim 1, wherein said AVEM [205] comprising:
    a. a ratchet-gear [230] with at least one tooth [235]; said ratchet-gear [230] is firmly attached to said output-wheel [130] and revolves accordingly;

b. at least one engagement-set [270], comprising: a pawl [275] and a weight [276]; said pawl [275] configured to mate with said ratchet's tooth [235]; said engagement-set is pivotally attached by a pivot holder [280] to said mediating-disk [120] and revolves accordantly;

c. at least one buckling-spring [260], fixed between said mediating-disk [120] and said weight [276];

said buckling-spring [260] configured to prevent mating of said pawl [275] with said ratchet's tooth [235], until centrifuge force of said weight's [276], caused by said angular-velocity of said mediating-disk [120], yields said buckling-spring [260], pivots said engagement-set [270] and enables said mating of said pawl [275] with said ratchet's tooth [235], such that power of said power source [160] is transformed via said output-wheel [130] and said mediating disk [120] to said driven-wheel [110];

load of said weight [276] and spring-constant K of its matching said buckling-springs [260] are correlated with angular-velocity of said mediating-disk's [120] required for said engagement of said output-wheel [130] with said driven-wheel [110] via said mediating-disk [120];

when angular-velocity of said driven wheel [120] is higher than of said gear sets [200], said mediating-disk [120] revolves faster than said output-wheel [130], consequently said pawl [275] separates from said ratchet's tooth [235] and slides on back [236] of said ratchet's tooth [235], such that said output-wheel [130] is disengaged from said mediating-disk [120] and said driven-wheel [110];

alternatively, when angular-velocity of said driven wheel [120] decreases, said weight [246] no longer exert enough said centrifuge force to overcome said buckling spring [260], such that said buckling spring [260] pushes out and separates said pawl [275] from mating said ratchet tooth [235].

3. The system [100] according to claim 2, wherein said weight [335], of said gear-set [300] having said output-wheel [131] with largest diameter, is lighter than its associated said pawl [330], and said spring [320] configured to keep said pawl [330] mated with said ratchet's tooth [235], as a default option until angular-velocity of said driven wheel [120] is higher than of said gear sets [200], said mediating-disk [120] revolves faster than said output-wheel [130], consequently said pawl [275] separates from said ratchet's tooth [235] and slides on back [236] of said ratchet's tooth [235], such that said output-wheel [130] is disengaged from said mediating-disk [120] and said driven-wheel [110].

4. The system [100] according to claim 2, wherein said spring constant K of said buckling spring [260] is relatively high; hence movement of said spring [260] for every practical consideration applies a constant force, until it yields, then said spring [260] is configured to turn to a bending-leaf spring with a relatively low spring constant K2; such that said engagement between said pawls [275] and said ratchet teeth [235] is abrupt; consequently said engagement occurs at higher angular-velocity than angular-velocity of said disengagement; engagement and said disengagement are configured with hysteresis therebetween.

5. The system [100] according to claim 2, wherein said AVEM [205] comprises two said engagement sets [270]; said AVEM further comprises two connecting rods [510], where each of said connecting rods [510] is connected to on first end to said pawl [275] and on second end to said following weight [276]; said connecting rods [510] configured to balance and synchronize said engagement and said disengagement of said two pawls [275] with said ratchet teeth [235].

6. The system [100] according to claim 3, wherein said AVEM [205] comprises two said engagement sets [270]; said AVEM further comprises two connecting rods [510], where each of said connecting rods [510] is connected to on first end to said pawl [275] and on second end to said following weight [276]; said connecting rods [510] configured to balance and synchronize said engagement and said disengagement of said two pawls [275] with said ratchet teeth [235].

7. The system [100] according to claim 3, wherein said spring [320] is a mechanism configured for predetermined threshold and hysteresis requirements.

8. The system [100] according to claim 1, wherein said output-wheel [130] is a sprocket-wheel configured to be attached to a revolving chain [140].

9. The system [100] according to claim 1, wherein said output-wheel [130] is a belt-wheel configured to be attached to a revolving belt [141].

10. The system [100] according to claim 1, wherein said output-wheel [130] is a cogged-wheel configured to be attached to a revolving timing-belt.

11. The system [100] according to claim 1, wherein two of said gear sets [200] are mounted along both sides of a single said mediating-disk [120] and on its' said dead-axle shaft [210].

12. The system [100] according to claim 1, wherein said outer perimeter [121] of said mediating-disk [120] comprises sprocket-teeth [122] and said inner perimeter [111] of said driven-wheel comprises notches [112] configured to mate with said mediating-disk's sprocket-teeth [111], such that said mediating-disk [120] is revolved by said driven-wheel [110].

13. The system [100] according to claim 1, wherein said mediating-disk [120] and said driven-wheel are configured as a planetary gear and an internal gear, respectively, further comprising a sun gear; thereby said mediating-disk [120] is revolved by said driven wheel [110].

14. The system [100] according to claim 1, wherein said system is configured to be integrated into a vehicle selected from the group consisting of: bicycles, tricycles, four-wheeled manpowered vehicles, pedal-boats, pedal driven manpowered light aircrafts or motorized vehicles.

15. The system [100] according to claim 3, wherein said pawls [275,330] comprise an elastomeric pad [277] configured for softening of said engagement, for reducing the wear of said pawls [275,330] and said ratchet teeth [235] and for balancing power transmission among said plurality of ratchet teeth [235].

16. The system [100] according to claim 1, wherein said dead-axel shaft [210] is replaced with a rotary shaft; said rotary shaft is fixed to said mediating-disk [120] and revolves accordingly.

17. The system [100] according to claim 15, wherein said system is configured without said driven wheel and wherein an output load is connected to said rotary shaft, thereby revolved by said rotary shaft; said output load is selected from a group consisting of: a wheel, a pedal wheel of a pedal boat, a home generator or any application where a human serves as the driving force and a gear is required.

18. The system [100] according to claim 1, wherein said power source [160] is selected from a group consisting of: revolving crank and revolving engine.

19. The system [100] according to claim 1, further comprising a mediator-wheel [115], sited on said dead-axle shaft

[210] and connected to said driven-wheel thereby spinning with same angular velocity; said mediator-wheel [115] configured to accommodate said at least one mediating-disk [120] such that said outer perimeter [121] of said at least one mediating-disk [120] is in partial contact with inner perimeter of said mediating-wheel [115] instead of said inner perimeter [111] of said driven-wheel [110].

20. The system [100] according to claim 19, wherein said mediator-wheel [115] is connected to said driven-wheel by plurality of spokes [163].

* * * * *